US012628816B2

(12) United States Patent
Tabbaa et al.

(10) Patent No.: US 12,628,816 B2
(45) Date of Patent: May 19, 2026

(54) STORAGE SOLUTION INCLUDING AN AQUEOUS CULTURE MEDIUM AND METHODS OF PRESERVATION OF LIVE ALLOGRAFTS

(71) Applicant: Restoration Biologics LLC, Flagstaff, AZ (US)

(72) Inventors: Suzanne M. Tabbaa, Flagstaff, AZ (US); William D. Bugbee, San Diego, CA (US); Jonathan M. Page, Mount Juliet, TN (US); Farshid Guilak, Clayton, MO (US)

(73) Assignee: Restoration Biologics LLC, Flagstaff, AZ (US)

( * ) Notice: Subject to any disclaimer, the term of this patent is extended or adjusted under 35 U.S.C. 154(b) by 864 days.

(21) Appl. No.: 17/826,626

(22) Filed: May 27, 2022

(65) Prior Publication Data

US 2022/0295780 A1 Sep. 22, 2022

Related U.S. Application Data

(62) Division of application No. 16/870,393, filed on May 8, 2020, now Pat. No. 11,369,107.

(Continued)

(51) Int. Cl.
| | | |
|---|---|---|
| *A01N 1/122* | (2025.01) | |
| *A01N 1/126* | (2025.01) | |
| *A01N 1/16* | (2025.01) | |

(52) U.S. Cl.
CPC ............. *A01N 1/122* (2025.01); *A01N 1/126* (2025.01); *A01N 1/16* (2025.01)

(58) Field of Classification Search
None
See application file for complete search history.

(56) References Cited

U.S. PATENT DOCUMENTS

| | | |
|---|---|---|
| 5,306,711 A | 4/1994 | Andrews |
| 8,637,230 B2 | 1/2014 | Doorschodt |

(Continued)

FOREIGN PATENT DOCUMENTS

WO WO2003013239 A2 * 2/2003

OTHER PUBLICATIONS

Faure et al., J. Transl. Med., 2016, 14:40, pp. 1-11 (Year: 2016).*

(Continued)

*Primary Examiner* — Manjunath N Rao
*Assistant Examiner* — Qing Xu
(74) *Attorney, Agent, or Firm* — Jordan IP Law, LLC

(57) ABSTRACT

A live tissue storage solution is formed of an aqueous culture medium including additives, inorganic salts and nutrients. The additives preferably include amino acids including but not limited to L-Arg, L-Cys, Gly, L-His, L-Ile, L-Lys, L-Leu, L-Met, L-Phe, L-Ser, L-Try, L-Try, and L-Val. The inorganic salts preferably include calcium chloride, sodium chloride, magnesium sulphate, sodium bicarbonate, sodium phosphate. The nutrients preferably include glucose, choline, folic acid, nicinamide, riboflavin, which are known to maintain cell culture. Examples include Dulbecco's Modified Eagle Medium DMEM or Minimal Essential Medium MEM with or without serum. The culture medium contains additives to reduce, inhibit, or mitigate lipid oxidation, lipotoxicy, lipid-induced responses, and lipid inflammation.

8 Claims, 2 Drawing Sheets

Related U.S. Application Data

(60) Provisional application No. 62/845,697, filed on May 9, 2019.

(56) References Cited

U.S. PATENT DOCUMENTS

| | | |
|---|---|---|
| 10,039,277 B2 | 8/2018 | Cook et al. |
| 2011/0236875 A1 | 9/2011 | Lee |
| 2014/0037763 A1 | 2/2014 | Tan |
| 2014/0113273 A1 | 4/2014 | Brockbank |
| 2015/0140543 A1 | 5/2015 | Shimko et al. |
| 2020/0054002 A1 | 2/2020 | Cook et al. |

OTHER PUBLICATIONS

Printout of Celsior product, retrieved on Mar. 7, 2025 from URL: https://igl-group.com/products/celsior/ (Year: 2025).*

Cellar et al., Analytica Chimica Acta, 2016, 934:180-185. (Year: 2016).*

Schmidt et al. Fresh Osteochondral Allograft Transplantation. The American J of Sports Medicine 45(10)2260-2266 Aug. 2017. (Year: 2017).

Teng et al. Assessment of Buffer Systems for Harvesting Proteins from Tissue Interstitial Fluid for Proteomic Analysis. J of Proteome Research 9(8)4161-4169, Aug. 6, 2010. (Year: 2010).

* cited by examiner

100

| | PALMITIC ACID % (C16:0) | STEARIC ACID % (C18:0) | OLEIC ACID % (C18:1) | LINOLEIC ACID % (C18:2) | LINOLENIC ACID % (C18:3) | ARACHIDONIC ACID % (C20:4) |
|---|---|---|---|---|---|---|
| STORAGE MEDIA | 14.1 | 4.5 | 25.4 | 15.1 | 8.9 | 4.6 |
| STORAGE MEDIA | 17.0 | 5.5 | 27.2 | 13.5 | 4.9 | 5.9 |
| BONE | 21.1 | 5.6 | 35.1 | 15.0 | 8.9 | 0.1 |
| BONE | 21.0 | 5.3 | 34.0 | 15.2 | 9.2 | 0.1 |

FIG. 2

STORAGE SOLUTION INCLUDING AN AQUEOUS CULTURE MEDIUM AND METHODS OF PRESERVATION OF LIVE ALLOGRAFTS

CROSS REFERENCE TO RELATED APPLICATIONS

This application is a divisional of U.S. patent application Ser. No. 16/870,393 titled "Live Tissue Storage Solution", filed on May 8, 2020, which claims benefit of U.S. provisional application 62/845,697, titled "Storage Solution and Methods of Preservation of Live Allografts" and filed May 9, 2019, the entire contents of which are incorporated herein by reference.

INCORPORATION BY REFERENCE

All publications and patent applications mentioned in this specification are herein incorporated by reference in their entirety to the same extent as if each individual publication or patent application was specifically and individually indicated to be incorporated by reference.

STATEMENT AS TO FEDERALLY SPONSORED RESEARCH

This invention was not made with Government support.

FIELD

This application relates to the field of live osteochondral or chondral tissues. More particularly, this application provides embodiments of a storage solution and method for preservation of live v or chondral tissues.

BACKGROUND

One of the major limitations of live allografts and osteochondral allografts (OCAs) for healthcare providers, tissue processing companies (entities that procure and process OCAs), and distributors is the limited shelf-life of 28 days. The short shelf-life of these live cartilage grafts limits the availability of the grafts to surgeons and patients, and also leads to significant cost lost through expiry of the grafts. OCAs are now clinically considered the standard of care to treat cartilage lesions and there is a high demand for these grafts. In the past decade, a number of published studies have investigated various media recipes to enhance chondrocyte viability during storage, including the use of fetal bovine serum and various additives. The mechanism of chondrocyte death during prolonged hypothermic storage is unknown. Various factors are known to affect preservation of live of tissues and organs—osmolarity, pH, reactive oxygen species (ROS), reactive nitrogen species (RNS), temperature, oxidation. Several proposals have been made to address these problems. See for example, U.S. Pat. Nos. 5,306,711 and 10,039,277 and U.S. Patent Application Publication Nos. 2014/0113273 and 2015/0140543 all of which are incorporated herein by reference. This technology describes a storage solution and preservation method to enhance chondrocyte viability and cartilage health during prolonged storage.

SUMMARY OF THE INVENTION

A live tissue storage solution is formed of an aqueous culture medium including additives, inorganic salts and nutrients. The additives preferably include amino acids including but not limited to L-Arg, L-Cys, Gly, L-His, L-Ile, L-Lys, L-Leu, L-Met, L-Phe, L-Ser, L-Try, L-Try, and L-Val. The inorganic salts preferably include calcium chloride, sodium chloride, magnesium sulphate, sodium bicarbonate, sodium phosphate. The nutrients preferably include glucose, choline, folic acid, nicinamide, riboflavin, which are known to maintain cell culture. Examples include Dulbecco's Modified Eagle Medium DMEM or Minimal Essential Medium MEM with or without serum. The culture medium contains additives to reduce, inhibit, or mitigate lipid oxidation, lipotoxicy, lipid-induced responses, and lipid inflammation.

The live tissue storage solution also preferably contains compounds or molecules that inhibit enzymes involved in lipid oxidation or lipotoxicity which could include redox-active compounds, iron-ligand inhibitors, flavonoids, corticosteroids, and nonsteroidal anti-inflammatory drugs. The live tissue solution also preferably includes compounds or molecules that modulate pathways associated with lipotoxicity, which could include fibrates and thiazolidinediones. Compounds or molecules that reduce reactive oxygen species, oxidation of lipids, and lipid peroxidation which include various antioxidants which could be used in combination are also preferably added to the solution. Examples include zinc, vitamin C (ascorbic acid), vitamin E (alpha-tocopherol), selenium, Trolox™ ((6-hydroxy-2,5,7,8-tetramethylchroman-2-carboxylic acid) a water-soluble analog of vitamin E), ebselen, glutathione, carotenes, ubiquinol (Coenzyme Q), propyl gallate (PG), butylated hydroxytoluene (BHT), butylated hydroxyanisole (BHA), hydrogen sulfide, erythrobate, sodium tripolyphosphate, ethylenediaminetetraacetic acid, ethoxyquin, caseinates, pyruvate, natural herbs, honey, and similar compounds that inhibit oxidation.

The live tissue storage solution also preferably contains additives such as compounds or molecules that inhibit or reduce generation of reactive oxygen species ROS, reactive nitrogen species (RNS), nitric oxide, peroxynitrite, and ceramide, as well as through intrinsic pathways that lead to apoptosis. The additives preferably include arginine-based inhibitors that inhibit nitric oxide synthase or nitric oxide production or compounds that inhibit Fas ligand-induced apoptosis and tumor necrosis factor related apoptosis (TRAIL).

Other additives such as compounds or molecules that inhibit enzymes from metabolizing arachidonic acid or other fatty acids that contribute to inflammation and cell death are also preferably included. Additives could include inhibitors of cyclooxygenase (COX) isoenzymes—nonsteroidal anti-inflammatory drugs (e.g. celecoxib, rofecoxib). Further possible additives include compounds or molecules that scavenge oxygen free radicals including N-acetylcystein NAC, glutathione, allopurinol, or material with redox properties such as cerium dioxide particles. Also, a cell membrane stabilizer additive or combinations of membrane stabilizer additives including tryptophan, polyethylene glycol, sugar, glycerol, alginate, hyaluronic acid, dimethyl sulfoxide are preferably included.

The storage solution has pH buffers, ions, or osmotic agents (gluconate, citrate, raffinose, glucose, sucrose, mannose, taurine) to generate an osmolarity of 200-400 mOsm, 250-450 mOsm, 300-500 mOsm, 350-550 mOsm, 400-600 mOsm, 450-650 mOsm 500-700 mOsm, 550-750 mOsm, 600-800 mOsm with ion concentration in the range of 1-500 mM.

A method of storing live tissues in the storage solution is also disclosed wherein the final storage solution is stored in a gas impermeable container and purged of oxygen with various gases including but not limited to nitrogen, $CO_2$, argon. The final concentration of oxygen may result in 0%, 0-2%, 0-18% oxygen, or 0-21% oxygen. The gas impermeable container that also prevents the transmission. The storage solution and tissue are preferably stored away from light in a darkened space or protected environment shielded from light exposure. The solution of optimized additives, osmolarity, and pH and is stored and maintained at temperatures within range of 0-10° C., 10-30° C., or 30-45° C. Live osteochondral allografts are stored in the solution contains an additive, compound, or molecule or combination that reduce, inhibit, or mitigate, lipotoxcity, peroxidation, lipid oxidation, or lipid inflammation.

A method of storing live tissues in storage solution that contains an additive, compound, or molecule or combination that reduce, inhibit, or mitigate lipotoxicity, peroxidation, lipid oxidation or lipid inflammation that is added to the storage solution at the initial time of storage and repeatedly added throughout the storage duration (e.g. additives are added weekly, monthly, daily). The additive may be encapsulated or combined with a delivery system to allow extended or controlled release over time.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 2 shows data that detected fatty acids in the storage solution following 28 days of prolonged storage of osteochondral tissues.

DETAILED DESCRIPTIONS OF THE PREFERRED EMBODIMENTS

Figure 1:
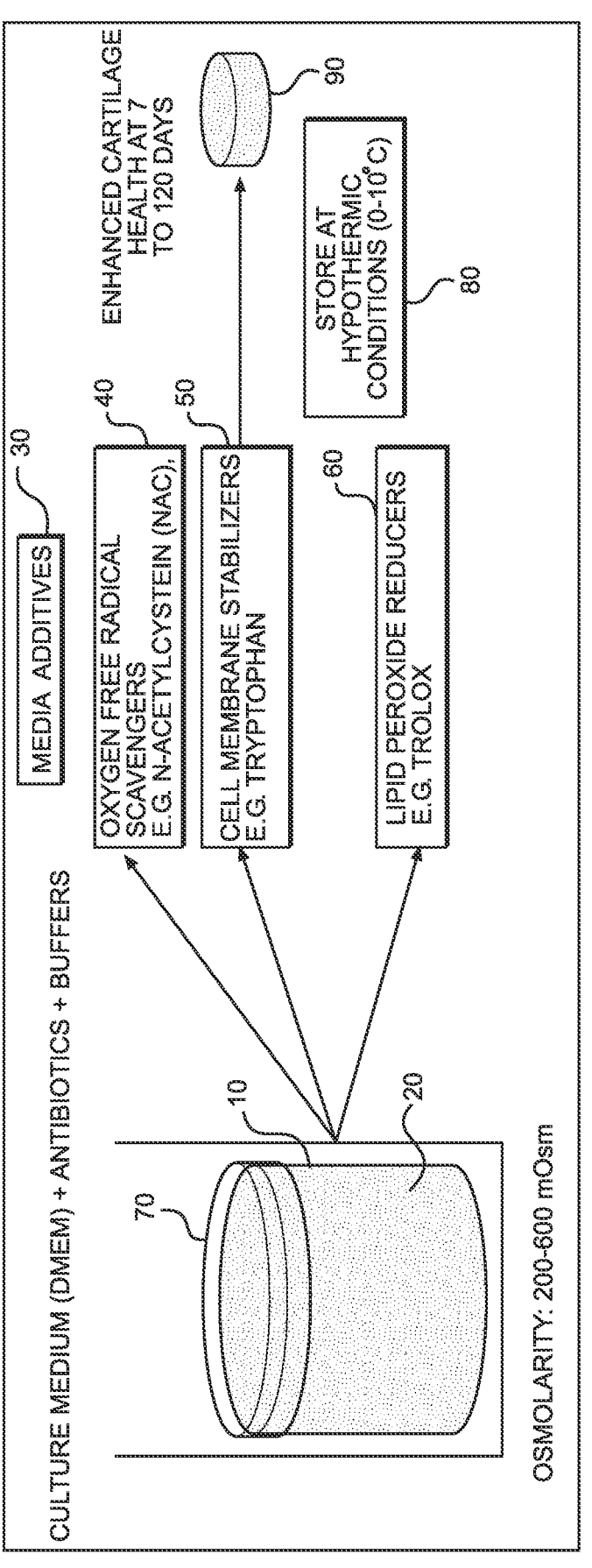
FIG. 1 shows an embodiment of a storage solution comprising optimized osmolarity, additives, and temperature to improve cartilage health.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

The storage solution is based on findings that demonstrate the presence of lipid components including free fatty acids in the subchondral bone of osteochondral tissues and in the storage media. The free fatty acids and triglycerides released into the media from the subchondral bone during standard storage conditions can affect chondrocyte viability. The fatty acids in marrow are both polyunsaturated fatty acids and saturated fatty acids. Unsaturated fatty acids are well established in literature to have a high tendency to oxidize. Oxidized lipids impair cell function and affect cell viability through various mechanisms. Accumulation of free fatty acids can also affect cell viability and function through lipotoxicity. The inventors of the current application are the first to recognize free fatty acids and oxidized lipids in the storage media of osteochondral tissue grafts as potential mediators for decline in chondrocyte viability. This technology describes a novel storage media for osteochondral tissue and other tissue grafts that is supplemented with inhibitors to prevent mechanisms associated with oxidized lipids and lipotoxicity. The technology also describes a preservation method to enhance the storage environment through optimization of media composition.

Storage Solution Containing Additives to Inhibit Oxidation of Lipids and Lipotoxicity of Chondrocytes The storage solution contains an aqueous culture medium that contains various additives (e.g. amino acids including but not limited to L-Arg, L-Cys, Gly, L-His, L-Ile, L-Lys, L-Leu, L-Met, L-Phe, L-Ser, L-Try, L-Try, L-Val, inorganic salts including but not limited to calcium chloride, sodium chloride, magnesium sulphate, sodium bicarbonate, sodium phosphate, and nutrients including but not limited to glucose, choline, folic acid, nicinamide, riboflavin) known to maintain cell culture Examples include Dulbecco's Modified. Eagle Medium DMEM or Minimal Essential Medium MEM with or without serum. The culture medium may contain additives including ascorbic acid, glutamine, antibiotics such as vancomycin or gentamycin, and d-amino acids.

The solution contains inhibitors of enzymes involved in lipid oxidation, lipotoxicity, and lipid inflammation. Examples of additives that inhibit these enzymes include redox-active compounds, iron-ligand inhibitors, flavonoids, corticosteroids, and nonsteroidal anti-inflammatory drugs.

The solution may contain compounds/molecules that inhibit receptors that modulate pathways associated with lipotoxicity or lipid-induced responses. This includes compounds that inhibit receptors that are activated by fatty acids and oxidized lipids. Examples of inhibitors include fibrates and thiazolidinediones.

The storage solution additives contain a mixture of anti-oxidants that reduce reactive oxygen species (ROS), reduce oxidation of lipids, and inhibit or reduce peroxidation. Examples include zinc, vitamin C (ascorbic acid), vitamin E (alpha-tocopherol), selenium, Trolox™, ebselen, glutathione, carotenes, ubiquinol (coenzyme Q), propyl gallate (PG), butylated hydroxytoluene (BHT), butylated hydroxyanisole (BHA), hydrogen sulfide, erythorbate, sodium tripolyphosphate, ethylenediaminetetraacetic acid, ethoxyquin, caseinates, pyruvate, natural herbs, honey and similar compounds that inhibit oxidation. The solution may combine multiple antioxidants for their different properties to prevent oxidation of lipids and accumulation of reactive oxygen species. Examples of antioxidant combination additives include glutathione, Trolox™, and ascorbic acid.

Lipotoxicity of the cells can be mediated through various mechanisms including generation of reactive oxygen species (ROS), nitric oxide, and ceramide, as well as through intrinsic pathways (apoptosis induced through death receptors). The storage solution may contain compounds that inhibit nitric oxide synthase to block nitric oxide production such as arginine-based inhibitors. The solution may include additives that block fatty acids from inducing apoptosis through extrinsic pathways, cell death receptors. Examples include compounds that inhibit Fas ligand-induced apoptosis and tumor necrosis factor related apoptosis (TRAIL). Additional compounds may be combined to inhibit mitochondrial metabolism and block ceramide production.

The storage solution may contain molecules or compounds that inhibit enzymes that metabolize arachidonic acid and other fatty acids that contribute to inflammatory pathways and cell death. This includes inhibitors to cyclooxygenase (COX) isoenzymes formally known as prostaglandin-endoperoxide synthase. Examples of inhibitors are nonsteroidal anti-inflammatory drugs which include celecoxib and rofecoxib.

The storage solution may include additives that stabilize and maintain cell membrane or protects the cellular membrane from stresses. Examples of additives that protect cell membrane include tryptopan, or polyethylene glycol (PEG-35). Other compounds that stabilize the cell membrane include trehalose or other sugars, glycerol, alginate, hyaluronic acid, dimethyl sulfoxide.

Storage solution contains oxygen or nitrogen free radical scavengers including but not limited to N-acetylcystein (NAC), glutathione, allopurinol, and/or material with redox properties such as cerium oxide nanoparticle, rod, or other forms. Concentration ranges of glutathione and allopurinol include 100 μmol/L-50 mmol/L and 50 μmol/L-50 mmol/L, respectively. The storage solution may include one or a mixture of these compounds.

The storage media may include a combination of any of the above inhibitors with various functions to inhibit pathways associated with lipotoxicity, ROS, and oxidized lipids.

The storage media may include antibiotics including gentamycin or vancomycin.

The storage media may include chemical modifications, encapsulation, or other mechanisms to allow for controlled release of various additives over an extended storage period.

Osmolarity

This application describes storage solution with osmolarity and ions to enhance chondrocyte viability. pH buffers such as sodium bicarbonate may also be added.

The storage solution osmolarity of 200-400 mOsm, 250-450 mOsm, 300-500 mOsm, 350-550 mOsm, 400-600 mOsm, 450-650 mOsm 500-700 mOsm, 550-750 mOsm, 600-800 mOsm with ion concentration in the range of 1-500 mM. Solution may contain osmotic agents to maintain osmolarity during storage. Examples include gluconate, citrate, raffinose.

1. $Na^+$ (1-500 mM)
2. $K^+$ (1-500 mM)
3. $Ca^{2+}$ (1-500 mM)
4. $Cl^-$ (1-500 mM)

The final storage solution may be purged of oxygen using various gases such as nitrogen, carbon dioxide, argon, hydrogen and stored in gas impermeable container or bag following oxygen purging. The storage solution and the tissue may be placed in a gas impermeable container or bag prior to purging to prevent any additional air. The composition of dissolved oxygen in the final storage solution following purging may be 0% to 21% or preferably 0-18% or more preferably 0% or most preferably 0-2%. The concentration of gas used to purge the oxygen may vary from 0% to 100%. The final storage solution may contain a mixture of gases at varying concentrations to reduce oxidation during storage. The gas impermeable container or bag may comprise of a material that also prevents the transmission of light to further reduce oxidation.

The Storage Process

In one exemplary process, osteochondral allografts are stored at temperatures well below typical medical storage temperature ranges. In one exemplary embodiment, the buffer containing allografts is maintained in a range of 0-10° C. In other exemplary embodiments, buffer containing OCA are stored within a temperature range of 10-30° C. or within a temperature 30-45° C. In one aspect, the buffer containing grafts is stored away from light, in a darkened space or in a protected environment that is shielded from exposure to light.

FIG. 1 shows various aspects for producing embodiments of storage solutions comprising optimized osmolarity, additives, and temperature controls to improve cartilage health. Specifically, a storage container 10 is filled with a storage solution 20 for cartilage including a culture medium with antibiotics and buffers resulting in an osmolarity of 200-600 mOsm. Media additives 30 such as oxygen free radical scavengers 40, e.g. N-acetylcystein (NAC); cell membrane stabilizers 50, e.g., tryptophan; and lipid peroxide reducers 60, e.g. Trolox™, are added. Then cap 70 is place on container 10 and container 10 is stored 80 at hypothermic conditions (0-10 degrees Celsius) resulting at 90, in enhanced cartilage health at 7 to 120 days. Accordingly, it is believed that embodiments of the improved temperature controlled OCA storage buffer provides enhanced OCA health at all timepoints of prolonged storage and extends shelf-life for more than more than 28 days, more than 60 days, more than 90 days, more than 120 days or up to 180 days.

As a result of storage in an embodiment of the buffer described herein, it is believed that an OCA that has been stored within the buffer during a period of time and under the temperature environment described demonstrates enhanced OCA health. As used herein, enhanced OCA health means that an OCA maintained viable chondrocytes >60%, or >70% or >90% and retained biomechanical and protein structure of the cartilage matrix. The OCA will maintain the structural components of the bone and cartilage tissue, while limiting the potential for oxidative stresses on the chondrocytes. Storage solution will contain less oxidized lipids compared to the standard storage processing procedures. The cartilage will contain less reactive oxygen species.

In one exemplary embodiment, there is provided a solution for providing enhanced storage of an OCA. The exemplary solution includes DMEM culture medium (aqueous solution with nutrients, amnion acids, and salts), gluconate with osmolarity between 350 mOsm-650 mOsm. In other embodiments, an exemplary solution may also contain one or more of ions with concentrations between 1-500 mM, pH buffers such as HEPES, free oxygen scavengers such as glutathione, COX-2 inhibitor (celecoxib), antioxidants to reduce oxidation (alpha-tocopherol), in any combination.

In still another exemplary embodiment there is provided a solution having enhanced storage of OCA. An exemplary solution may include DMEM culture medium or other types of medium including but not limited to Eagle's Minimum Essential Medium (EMEM) or Ham's F-12 (aqueous solution with nutrients, amnion acids, and salts), gluconate with osmolarity between 350 mOsm-650 mOsm, ions with concentrations between 1-500 mM, multiple antioxidants with different properties (alpha-tocopherol, glutathione, ascorbic acid), molecules that reduce lipid oxidation (flavonoids), inhibitors to cell lipotoxicity (thiazolidinediones), cell membrane stabilizer (tryptophan), in any combination.

In still another exemplary embodiment, there is provided a method of providing an OCA having enhanced attributes or characteristics for suitability to be used in a mammal subject. First, there is a step of providing an OCA into a buffer solution comprising a solution as described herein. One example solution may contain one or more or a combination of: DMEM culture medium (aqueous solution with nutrients, amnion acids, and salts), gluconate with osmolarity between 350 mOsm-650 mOsm, ions with concentrations between 1-500 mM, pH buffers such as HEPES, free oxygen scavengers such as glutathione, COX-2 inhibitor (celecoxib), antioxidants to reduce oxidation (alpha-tocopherol). Next, the tissue and storage solution will fill a gas impermeable container or bag prior to purging the oxygen. Following gas purging, there is a step of maintaining the OCA in the solution at a desired temperature. For example, there is a step of maintaining the solution containing the OCA within a temperature range of 0-10° C., or 10-30° C., or 30-45° C. Thereafter, there is a step of removing the OCA after a storage period of at least 7 days; and then implanting the OCA into mammal.

EXAMPLES

Preliminary Research

Osteochondral cores were stored at 4° C. in standard DMEM with 10% fetal bovine serum and antibiotics for 28 days. Media without tissue was stored and used as a control group. After 28 days, the media was collected to determine if fatty components were released during storage. UPLC-GC analysis was used to measure the lipid composition of the collected media and of the subchondral bone. 1 mg of total lipid was released during storage. Fatty acids were detected in both the storage media and the bone (As can be seen in table 100 reproduced in FIG. 2). Higher levels of unsaturated fatty acids were detected in the storage media indicating mechanisms of cell death associated with fatty acids and lipotoxicity may play a role in cartilage health during storage.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of storing live tissues in an aqueous culture medium comprising:

preparing the aqueous culture medium for storing live tissues, the medium comprising: inhibitors of cyclooxygenase (COX) isoenzymes and/or nonsteroidal anti-inflammatory drugs; and a combination of aqueous and lipid soluble antioxidants including 6-hydroxy-2,5,7,8-tetramethylchroman-2-carboxylic acid and alpha-tocopherol; wherein the inhibitors include celecoxib and/or rofecoxib;

storing the aqueous culture medium in a gas impermeable container;

placing a live tissue allograft in the container; and purging oxygen from the container with various gases to drop a concentration of oxygen to 0-2% oxygen.

2. The method of claim 1, further comprising storing the container away from light in a darkened space or protected environment shielded from light exposure.

3. The method of claim 2, further comprising maintaining a temperature of the aqueous culture medium within a range of 0-45° C.

4. The method of claim 3, further comprising maintaining the live tissue allograft viable for more than 28 days.

5. The method of claim 4, further comprising maintaining the live tissue allograft viable for more than 60 days.

6. The method of claim 5, further comprising maintaining the live tissue allograft viable for more than 90 days.

7. The method of claim 6, further comprising maintaining the live tissue allograft viable for more than 120 days.

8. The method according to claim 1, wherein the combination of aqueous and lipid soluble antioxidants also includes at least one of zinc, vitamin C, selenium, ebselen, glutathione, carotenes, ubiquinol, propyl gallate, butylated hydroxytoluene, butylated hydroxyanisole, hydrogen sulfide, erythrobate, sodium tripolyphosphate, ethylenediaminetetraacetic acid, ethoxyquin, caseinates, pyruvate, natural herbs, honey, and combinations thereof.

\* \* \* \* \*